United States Patent
He et al.

(10) Patent No.: US 8,558,509 B2
(45) Date of Patent: Oct. 15, 2013

(54) BATTERY PROTECTION MECHANISM

(75) Inventors: Long He, Shenzhen (CN); Wei Feng, Shenzhen (CN); Jianjing Lv, Shenzhen (CN); Jun Zhou, Shenzhen (CN)

(73) Assignee: BYD Company Limited (CN)

( * ) Notice: Subject to any disclaimer, the term of this patent is extended or adjusted under 35 U.S.C. 154(b) by 803 days.

(21) Appl. No.: 12/255,844

(22) Filed: Oct. 22, 2008

(65) Prior Publication Data

US 2009/0108808 A1    Apr. 30, 2009

(30) Foreign Application Priority Data

Oct. 30, 2007  (CN) .......................... 2007 1 0166052

(51) Int. Cl.
*H02J 7/00* (2006.01)
(52) U.S. Cl.
USPC .......................................................... 320/134
(58) Field of Classification Search
USPC ................... 320/134, 136, 155–159
See application file for complete search history.

(56) References Cited

U.S. PATENT DOCUMENTS

| | | | | |
|---|---|---|---|---|
| 5,180,961 A * | 1/1993 | Tsujino | ......................... | 320/161 |
| 5,397,991 A * | 3/1995 | Rogers | ......................... | 320/125 |
| 5,557,190 A * | 9/1996 | Brotto | ........................ | 320/161 |
| 5,646,508 A * | 7/1997 | van Phuoc et al. | ............ | 320/152 |
| 5,796,588 A | 8/1998 | Machida | | |
| 5,990,663 A * | 11/1999 | Mukainakano | ............... | 320/134 |
| 6,396,245 B1 * | 5/2002 | Jeong et al. | ................... | 320/132 |
| 7,129,001 B2 | 10/2006 | Munenaga et al. | | |
| 2005/0127879 A1 * | 6/2005 | Sato et al. | ..................... | 320/134 |
| 2006/0088761 A1 | 4/2006 | Ota | | |
| 2009/0136836 A1 | 5/2009 | Xu et al. | | |
| 2009/0142659 A1 | 6/2009 | Lai et al. | | |
| 2009/0142661 A1 | 6/2009 | Xiang et al. | | |

FOREIGN PATENT DOCUMENTS

| | | |
|---|---|---|
| CN | 1304559 | 7/2001 |
| CN | 2829107 | 10/2006 |

(Continued)

OTHER PUBLICATIONS

European Search Report for EP08400053 (mailed Apr. 3, 2009).

(Continued)

*Primary Examiner* — Melissa Koval
*Assistant Examiner* — Daniel Miller
(74) *Attorney, Agent, or Firm* — Greenberg Traurig, LLP

(57) ABSTRACT

The present invention teaches methods and systems for detecting internal battery abnormalities during charging and discharging states. The embodiments of the invention includes a circuit for determining charging and/or discharging state of the battery, a circuit for sampling the battery voltage at sequential time points, a circuit for measuring the decline of the voltage, a counter for counting $T_{dec}$ the time while the voltage is in decline, a circuit for measuring the rate of the decrease of the voltage, a circuit for producing an indicator for internal abnormality if one or more of the following conditions is met: (a) the battery is in the charging state and $T_{dec}$ exceeds a predetermined time; (b) the battery is in the charging state and the decrease of the voltage exceeds a predetermined voltage; and (c) the battery is in the discharging state and the rate of the decrease of the voltage exceeds a predetermined decline rate.

7 Claims, 5 Drawing Sheets

(56) References Cited

FOREIGN PATENT DOCUMENTS

| | | |
|---|---|---|
| CN | 101075667 | 11/2007 |
| CN | 201122609 | 9/2008 |
| CN | 201122624 | 9/2008 |
| DE | 10100626 | 8/2001 |
| JP | 56167267 | 12/1981 |
| JP | 59121778 | 7/1984 |
| JP | 09103034 | 4/1997 |
| JP | 2005073497 A * | 3/2005 |

OTHER PUBLICATIONS

USPTO Transaction History of U.S. Appl. No. 12/247,111, filed Oct. 7, 2008, entitled "Battery Spacer."

USPTO Transaction History of U.S. Appl. No. 12/247,425, filed Oct. 8, 2008, entitled "Battery Cover."

USPTO Transaction History of U.S. Appl. No. 12/256,769, filed Oct. 23, 2008, entitled "Battery Electrode Structure."

* cited by examiner

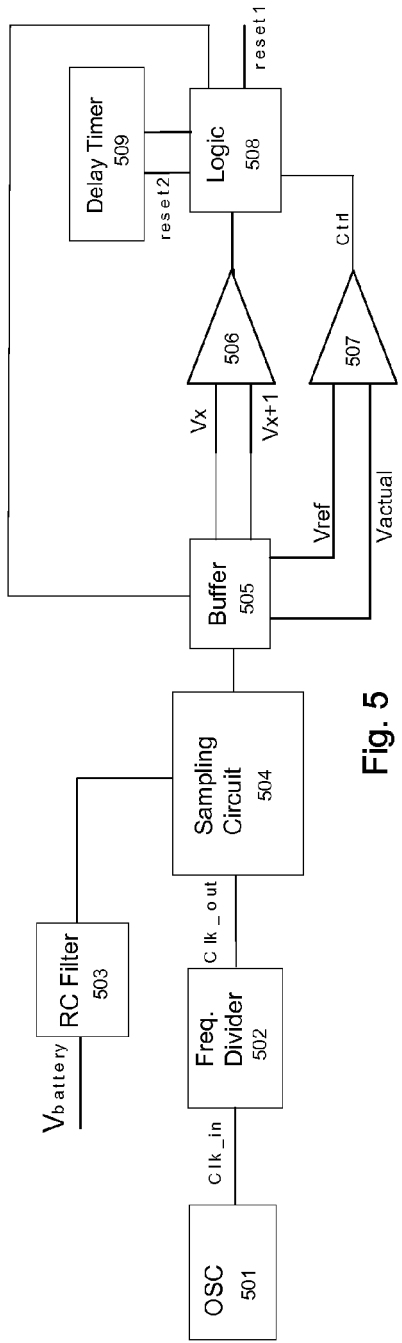
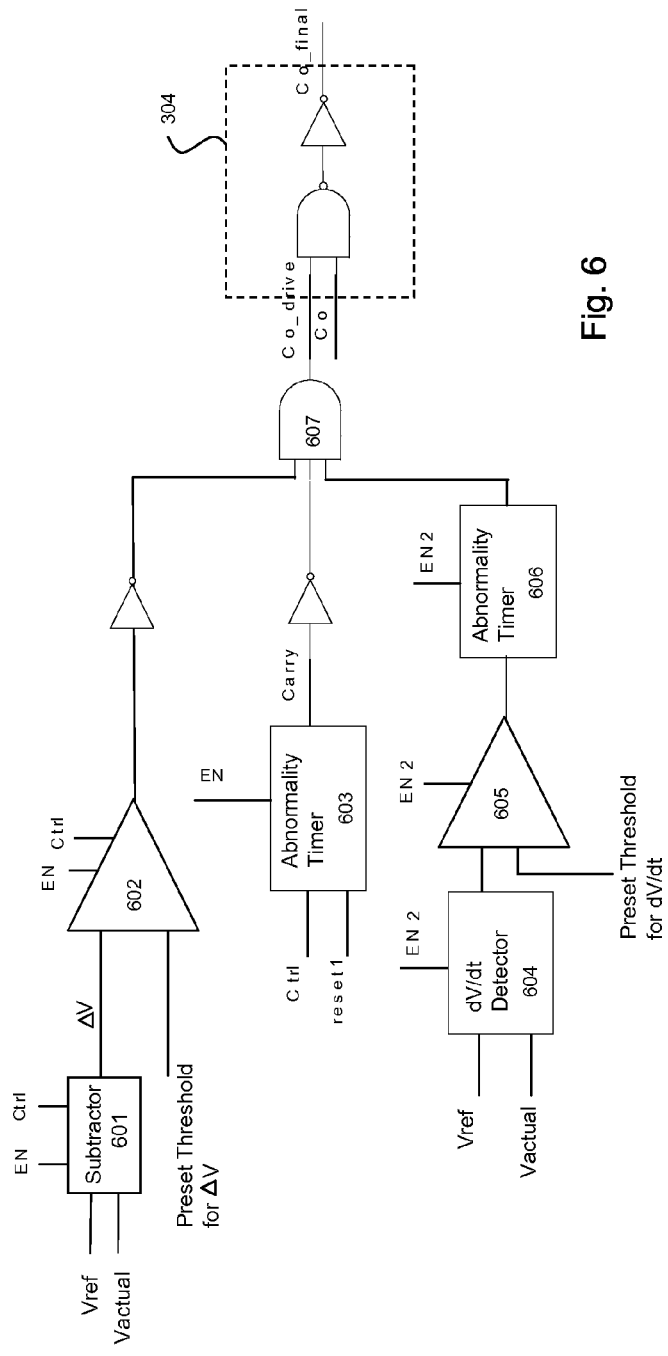
Fig. 5
Fig. 6

BATTERY PROTECTION MECHANISM

CROSS REFERENCE TO RELATED APPLICATIONS

This application claims priority to Chinese Patent Application No. 200710166052.6, filed Oct. 30, 2007.

FIELD OF THE INVENTION

The present invention relates to methods and related devices for battery protection.

BACKGROUND

The lithium-ion battery has many advantages, such as its small size, high energy density, high cycle life, low self-discharge rate and no memory effect. Increasingly it has been used broadly as a major power device for mobile phones, notebook computers, digital cameras, electric cars and other products. Lithium-ion battery, however, is susceptible to damage and may catch fire if used improperly such as in case of overcharging or short circuits. Protective devices have been known for many years for detecting and preventing battery damage caused by such external factors, e.g., short circuits or overcharging. However, even in the course of normal use, lithium-ion batteries may develop side reactions in its internal electrochemical reactions, especially in the process of charging and discharging the battery. Such abnormal internal conditions may seriously affect the battery performance and its life. They also may produce large amounts of gas and cause the battery internal pressure to increase rapidly, leading to explosions and fires. It is thus desirable to use a protective circuit to monitor the charging and discharging of lithium-ion batteries to prevent the development of the abnormal internal conditions.

SUMMARY

The present invention teaches methods and devices for detecting a battery's internal abnormality during charging or discharging of the battery. One embodiment of the invention is a method for detecting a battery's internal abnormality during the charging state of the battery. It comprises sampling the battery voltage for a period of time, determining whether the voltage is in decline, determining the time period of continuous voltage decline, determining the amplitude of the voltage decline, and producing an indicator for internal abnormality if the time period of continuous voltage decline exceeds a predetermined time or the amplitude of the voltage decline exceeds a predetermined voltage threshold.

Another embodiment is a method for detecting a battery's internal abnormality during the discharging state. It comprises sampling the battery voltage for a period of time, determining whether the voltage is in decline, measuring the rate of the voltage decline, determining whether the rate of the voltage decline exceeds a predetermined decline rate, tracking $T_{rate}$, which is the time while the rate of the voltage decline exceeds a predetermined decline rate, producing an indicator for internal abnormality if $T_{rate}$ exceeds a preset threshold.

Yet another embodiment is a system for preventing battery damage by internal abnormalities during charging or discharging. It comprises a circuit for determining whether the battery is in charging or discharging status, a circuit for sampling the battery voltage at sequential time points, a circuit for measuring the decline of the voltage, a first counter for counting $T_{dec}$, which is the time while the voltage is in decline, a circuit for measuring the rate of the decrease of the voltage, and a circuit for producing an indicator for internal abnormality if one or more of the following conditions are met: (a) the battery is in the charging state and $T_{dec}$ exceeds a predetermined time; (b) the battery is in the charging state and the decrease of the voltage exceeds a predetermined voltage threshold; and (c) the battery is in the discharging state and the rate of the decrease of the voltage exceeds a predetermined decline rate.

A group of embodiments further include a charging/discharging circuit and a switch that turns off the charging/discharging circuit in response to the indicator of internal abnormality described above. Other variations, embodiments and features of the present invention will become evident from the following detailed description, drawings and claims.

BRIEF DESCRIPTION OF THE DRAWINGS

FIGS. 4-6 illustrate embodiments of the invention shown in FIG. 3, namely, FIG. 4 depicts an implementation of the Status Module 301, FIG. 5 depicts an implementation of the Voltage Module 302 and part of the Logic Module 303, and FIG. 6 depicts an implementation of the main part of the Logic Module 303 and the Drive Module 304;

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 1:
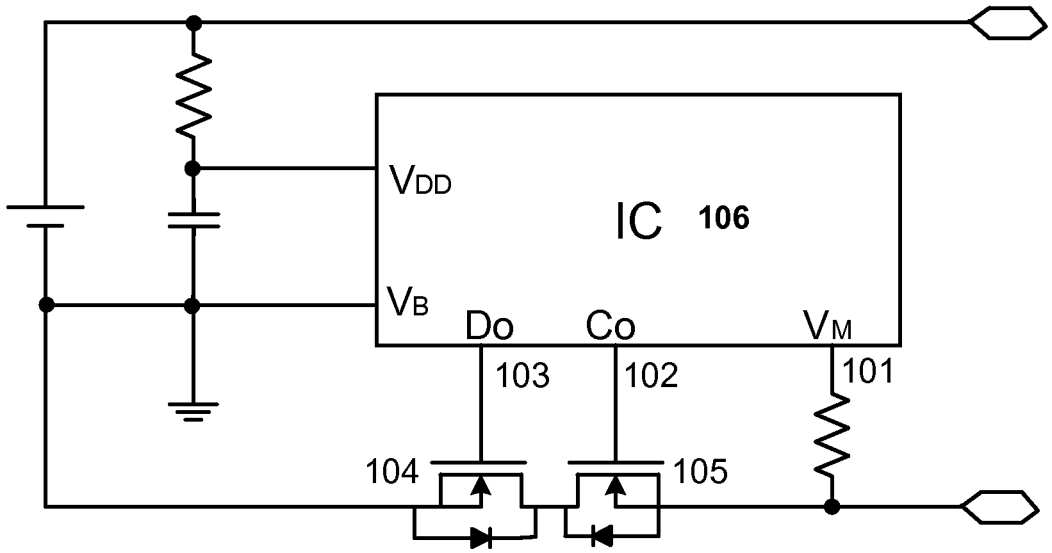
FIG. 1 is a diagram for a prior art battery protection switching circuit.

FIG. 1 is a prior art circuit for detecting over-current charging or discharging problems and for shutting down the charging or discharging circuit. The circuit consists of the Control IC 106, the charging MOS switch 105 and discharging MOS switch 104. The control IC monitors the battery voltage and circuit current. The Control IC's charge control terminal 102 is connected to the charging MOS switch 105, while its discharging control terminal 103 is connected to the discharging MOS switch 104. Upon detecting a charging over-current condition, terminal 102 output turns from high to low, shutting down switch 105. In a discharging over-current situation, terminal 103 goes from high to low and shut down switch 104. The charging/discharging status in FIG. 1 is reflected in the voltage difference between $V_M$ (the voltage at the over-current detection terminal 101) and $V_B$ (the voltage of the battery anode). If $V_M$ is less than $V_B$, the battery is being charged; otherwise, the battery is being discharged. The voltages can be measured or continuously monitored with various known methods.

The present invention discloses a method for monitoring internal abnormalities of a battery. When the battery is being charged, if the battery voltage shows a sudden and significant decrease, or the battery voltage decreases slowly but consistently for an extended period of time, it is an indication of an internal abnormality. For the latter indicator, to prevent false alarms, the present invention does not count it as an internal abnormality if after a period of voltage decline, the voltage starts to increase for a certain period of time. For detecting internal abnormalities when the battery is being discharged, if the rate of the voltage reduction is unusually fast, it is also an indication of a battery internal problem. Upon detecting internal abnormalities, the present invention turns off the charging or discharging circuit to prevent battery damage or fire hazards.

Figure 2:
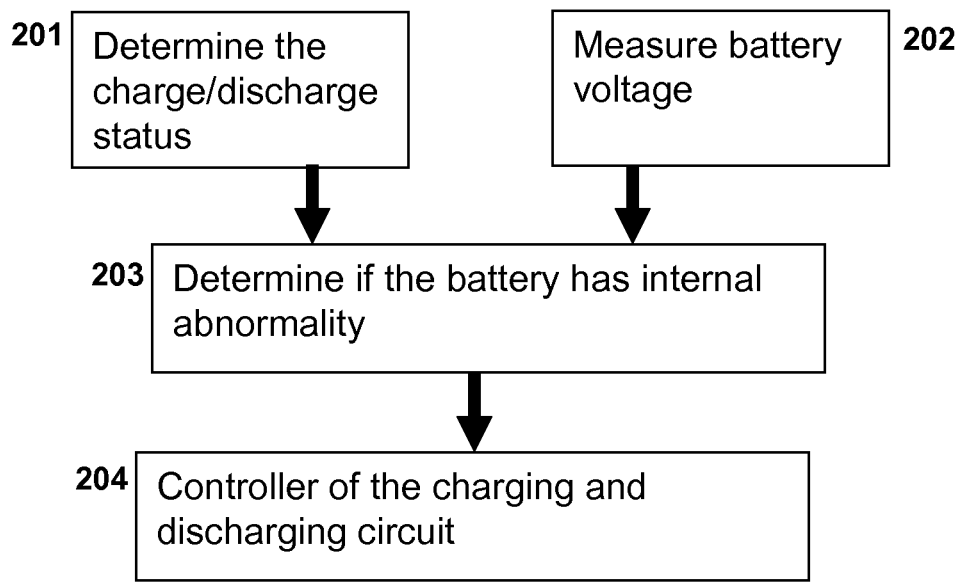
FIG. 2 is a flowchart showing an embodiment of the present invention.

The embodiment of the present invention may include several basic functional modules. As shown in FIG. 2, functional module 201 determines the charging/discharging status of the battery and module 202 measures the battery voltage. Module 203 determines whether the battery has any internal abnormality. When such abnormality is detected, module 204 switches off the charging or discharging circuit.

Figure 3:
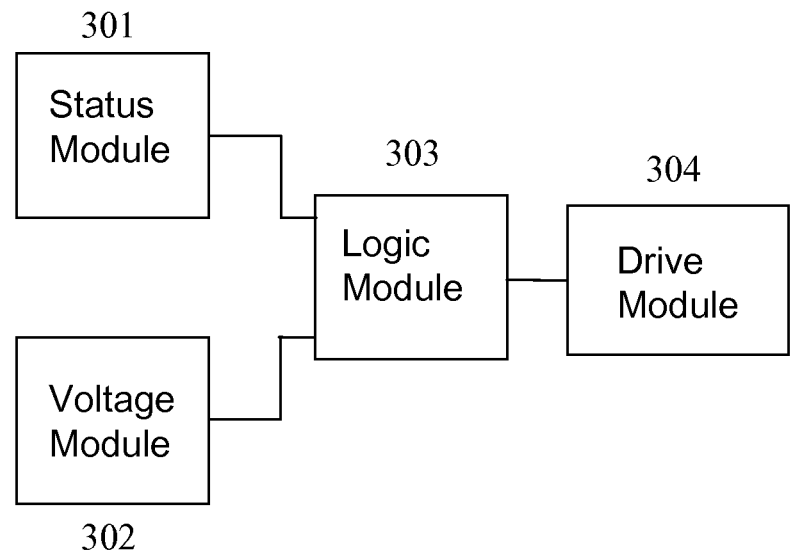
FIG. 3 shows the functional modules of an embodiment of the present invention.

FIG. 3 is another embodiment of the present invention. It shows the structural modules of an implementation of the invention. Status Module 301 detects the charge/discharge status, i.e., whether the battery is being charged or discharged. The Voltage Module 303 measures battery voltage and its changes. The Logic Module 303 determines whether there is an internal abnormality based on the measurement data. The Drive Module 304 switches off the charging or discharging circuit in response to signals from Logic Module 303.

The modules in the above-described system can be implemented by various embodiments. For example, the Status Module 301 may be implemented by the circuit shown in FIG. 1 for measuring and comparing $V_M$ and $V_B$ to determine whether the battery is in the discharge or charge state. The Voltage Module 302 may be implemented using pulse or continuous sampling method to obtain digital readings of the battery voltage. The Logic Module 303 may be designed in a way that it outputs an internal abnormality signal under the following three conditions:

(1) If the battery is being charged and the battery voltage decreases by an amplitude larger than a predetermined threshold value. The threshold amplitude change is 175-225 mV (e.g., 200 mV).

(2) If the battery is being charged and the battery voltage continues to decrease for a time period longer than a predetermined time threshold. The threshold time is 8-23 seconds (e.g., 15 seconds).

(3) If the battery is in the discharge state and the rate of decrease of the battery voltage is greater than a predetermined threshold. The threshold rate is 250-350 mV/sec (e.g., 300 mV/second). The minimal time period for the abnormal voltage decline rate is 250-750 μs (e.g., 500 μs).

The Drive Module 304 may be implemented using a circuit similar to what is shown in FIG. 1, where the charging or discharging circuit may be switched off by controlling the switches 105 or 104, respectively.

Figure 4:
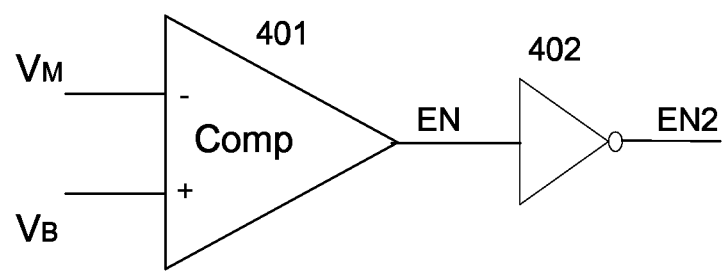

FIGS. 4-6 illustrate certain embodiments of the present invention. FIG. 4 shows a circuit implementation of Status Module 301, using a comparator 401 and inverter 402. The comparator 401 compares the voltages $V_M$ and $V_B$, as shown in FIG. 1. The comparator's output signal EN turns high when $V_M < V_B$, i.e., when the battery is the charging state. A discharging state signal, EN2, is obtained through an inverter 402. When the battery is in the discharging state, i.e., when $V_M > V_B$, the signal EN turns low and EN2 turns high. The status signals EN and EN2 are used to enable detection circuits for internal abnormalities occurred in the charging and discharging state, respectively, as shown in FIG. 6.

FIG. 5 implements the Voltage Module 302 and part of the logic module. It starts with an oscillator 501 which provides a high-frequency clock signal, Clk-in, to a frequency divider 502. The frequency divider 502 outputs a square wave clock signal Clk_out to the sampling circuit 504. The battery voltage $V_{battery}$ is fed to the sampling circuit 504 through an RC filer 503. The sampling circuit has an Analog-to-Digital converter which outputs digitized battery voltage measurements to the buffer 505. The buffer 505 feeds the voltage samples at the clock point X (i.e., $V_x$) and X+1 (i.e., $V_{x+1}$) to the comparator 506.

Comparators 506 and 507, together with Logic 508 and Delay Timer 509, form a delay circuit that keeps track whether the battery voltage goes up temporarily in a voltage decline to prevent false alarm. When $V_{x+1}$ is lower than $V_x$, the output of the comparator 506 goes to high. The logic unit 508 then signals to the buffer 505 to keep $V_x$ as the reference voltage ($V_{ref}$). All the voltage samples ($V_{actual}$) is compared to $V_{ref}$ through the comparator 507. When $V_{actual}$ is higher than $V_{ref}$, the output signal of comparator 507, ctrl, goes to low, which triggers the logic unit 508 to command the delay timer 509 to start counting the "delay," an indicator of the time period when the battery voltage increases. When the delay reaches a preset threshold (3 seconds, for example), the logic unit 508 tells the buffer to store the $V_{actual}$ as the new $V_{ref}$ and sends out the first reset signal, reset1. If the delay is shorter than the threshold time, the logic unit 508 resets the delay timer 509 through a second reset signal, reset2.

FIG. 6 shows an embodiment of the Logic Module 303. During the charging state, the internal abnormality is detected by the voltage amplitude drop detector, which consists of a subtractor 601 and a comparator 602. The subtractor 601 outputs a signal $\Delta V$ which is the difference between the amplitude of the reference voltage ($V_{ref}$) and the actual voltage ($V_{actual}$). The comparator 602 compares $\Delta V$ to a preset threshold for $\Delta V$ and its output goes to high if $\Delta V$ is greater than the threshold. The output of the comparator 602 goes to an AND gate 607 through an inverter.

Both 601 and 602 are controlled by the charging status indicator EN, which is provided by the charging/discharging status circuit shown in FIG. 4. Only when EN is high (i.e., when $V_M$ is smaller $V_B$ as shown in FIG. 4) are 601 and 602 enabled, which ensures that they only work during the battery's charging state. Circuits 601 and 602 are also controlled by the "ctrl" signal from the comparator 507 of FIG. 5. When ctrl turns high, it means that it is the initiation point for the abnormality detection period and the subtractor 601 and the comparator 602 are thus enabled.

The ctrl and EN signals also initiate the abnormality counter 603. When the abnormal time duration reaches a preset threshold value, the output of 603 turns high, which is connected to an AND gate 607 via an inverter. The abnormality timer 603 may be reset by the reset1 signal from FIG. 5, which indicates the return of the battery to normal status and the counting of the abnormality time period is restarted.

During the battery's discharging state, the internal abnormality may be detected by the circuit consisting of a voltage decline rate detector (dV/dt Detector) 604, comparator 605 and abnormality timer 606. The dV/dt Detector 604 may include a differentiator that measures the rate of voltage decline (i.e., −dV/dt). The output of 604 is compared with a preset threshold dV/dt value through the comparator 605. The output of 605 turns high when the rate of voltage decline is greater than a preset threshold value, which in turn starts the abnormality timer 606. When the abnormality lasts longer than a threshold time, the output of the abnormality timer 606 goes to low. The output of the abnormality timer 606 also goes to the AND gate 607. The discharging abnormality circuits 604, 605, and 606 are controlled by the discharging status indicator EN2 from FIG. 4.

The AND gate 607 thus receive three abnormality signals as its inputs. If any one of the three abnormality signals is low, the output of the AND gate 607 (i.e., Co-drive) goes to low, which signals an internal abnormality of the battery.

The Drive Module 304 in FIG. 3 is implemented with the circuit shown in a dotted rectangle in FIG. 6. The internal abnormality signal Co_drive is combined with the external abnormality signal Co as the inputs for a NAND gate. The output of the NAND gate becomes the final drive signal (Co_final) through an inverter. Co_final becomes low if either Co_drive or Co becomes low, which shuts down the charging or discharging gate switch to protect the battery.

Figure 7:
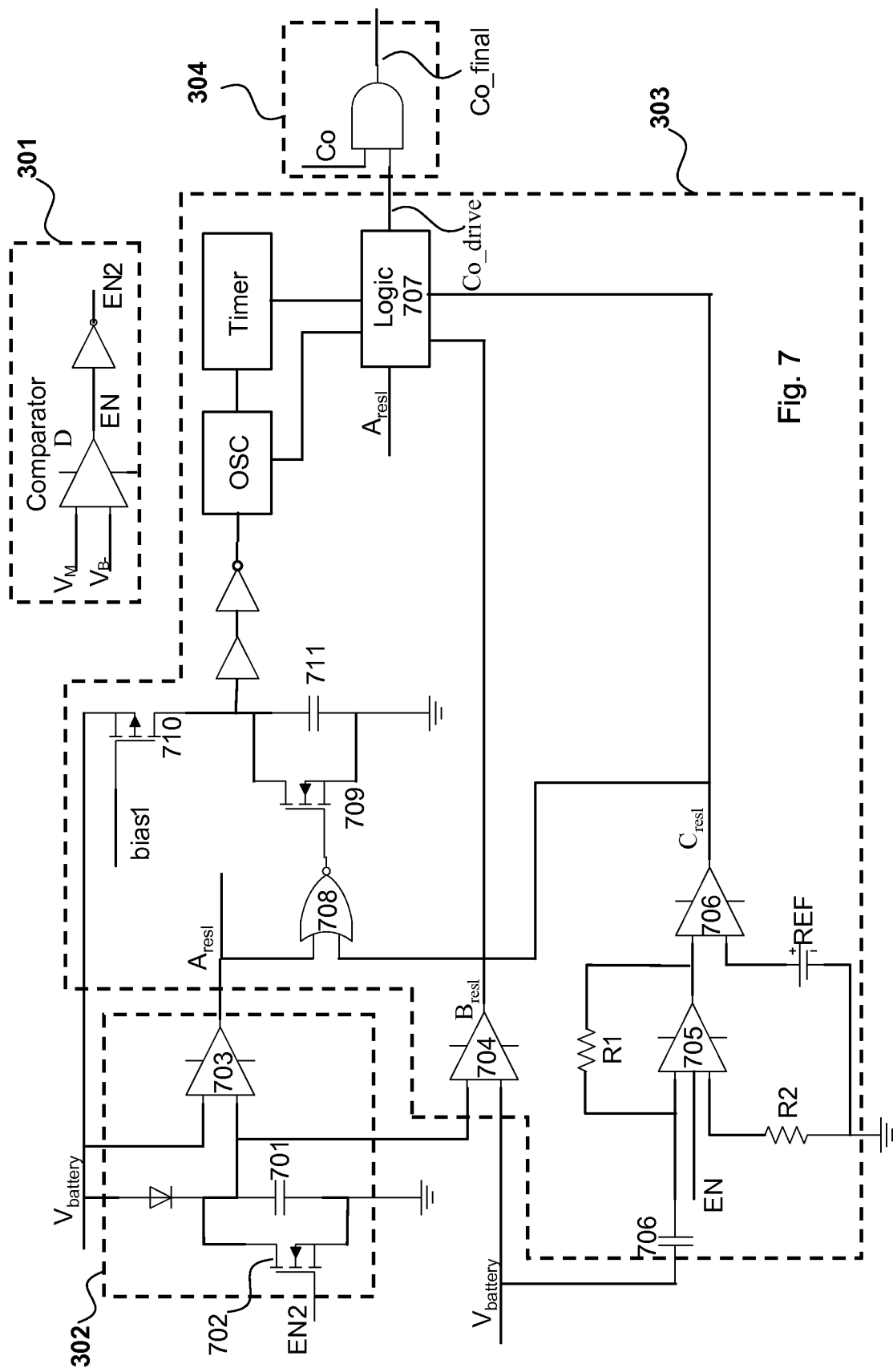
FIG. 7 shows another embodiment of the invention.

FIG. 7 is another embodiment of the invention. The dotted lines show the modules 301-304 illustrated in FIG. 3. The Status Module 301 is implemented similarly as in FIG. 4. The Voltage Module 301 contains a capacitor 701 and an NMOS 702 for measuring the battery voltage $V_{battery}$ at time X and X+1. Module 301 also contains a comparator 703 for detecting voltage decline. When $V_M$ is smaller than $V_B$, EN is high and EN2 is low. NMOS 702 is off, which enables the capacitor 701 to maintain the voltage at X+1. Thus, the comparator's inputs are the voltages at X (Vx) and X+1 (Vx+1) and its output is Ares1. When the voltage decrease, i.e., Vx is greater than Vx+1, Ares1 goes to high which signals the start of the battery abnormality detection period.

The Logic Module 303 has four major components. The first component of module 303 is a differential comparator 704 which determines whether the voltage drop ΔV is larger than a threshold $\Delta V_{ref}$. The output signal of 704 (Bres1) turns high when the voltage drop is greater than a preset threshold which causes Co-drive of the Logic 707 to become low, indicating internal abnormality.

Module 303 also contains a differentiator, which consists of comparator 705, capacitor 706, and resistors R1 and R2. The differentiator is controlled by the discharge signal EN and measures the rate of the voltage decline, dV/dt, and compares it with a reference value through comparator 706. The output of 706 (Cres1) goes to high when dV/dt is larger than the threshold value, which turns Co-drive of Logic 707 to low, signaling battery abnormality.

NOR gate 708, NMOS 709, PMOS 710 and capacitor 711 form a delay circuit. The delay threshold is determined by the discharge time of capacitor 711. The delay circuit determines whether the abnormality lasts longer than the threshold time, which is the delay time. If such is the case, the oscillator OSC starts to work and the timer starts to count. The signals Ares1 and Cres1 are inputted into the Logic 707 to indicate whether the threshold time should be for the charging or discharging state.

Module 304 is similar to that in FIG. 6, where the internal abnormality signal Co_drive is combined with the external abnormality signal Co to trigger the shutting down of the charge or discharge circuit.

Figure 8:
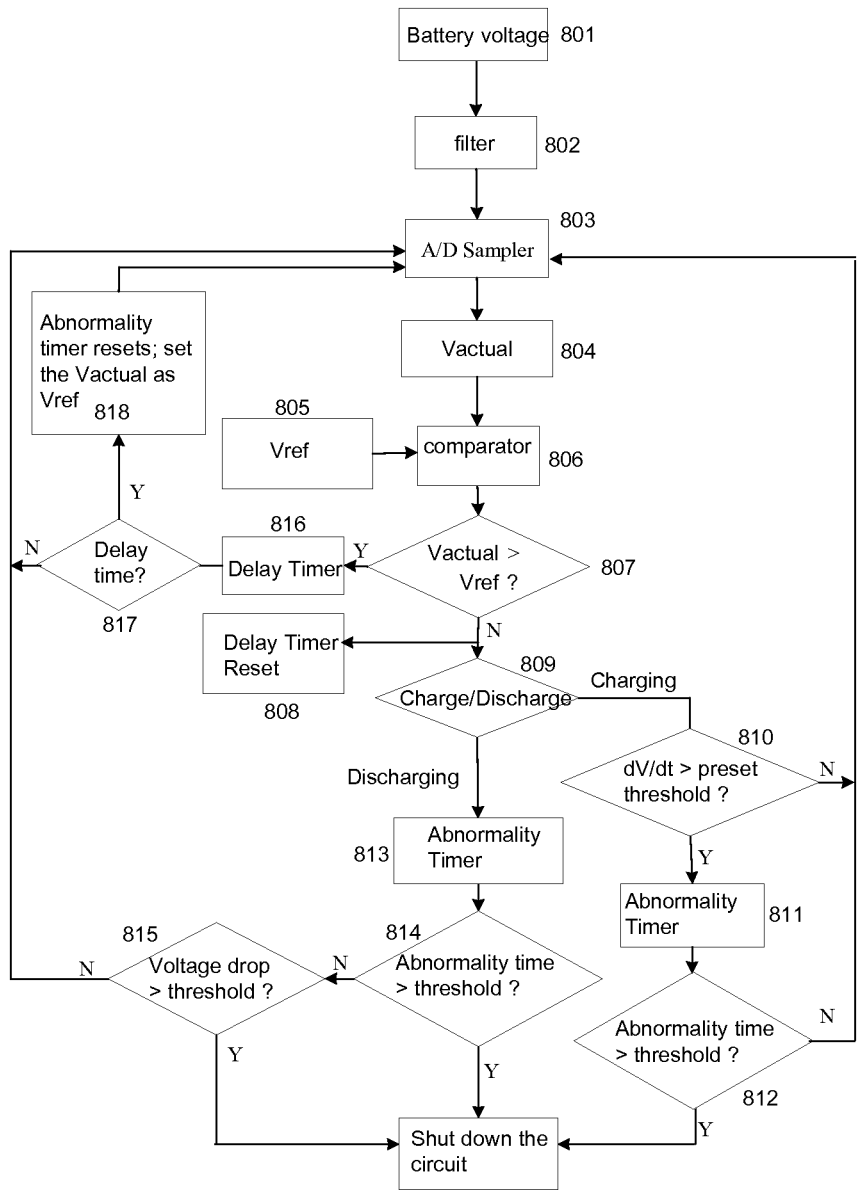
FIG. 8 shows a flow chart implementation of the invention.

FIG. 8 shows a flow chart that depicts the logic flow of an embodiment of the present invention. The battery voltage 801 is sampled by an analog-to-digital sampler 802, the latter outputting a digital actual voltage measurement $V_{actual}$. $V_{actual}$ is compared with a reference voltage, $V_{ref}$, through a comparator 806. If the $V_{actual}$ is not greater than $V_{ref}$, the device seeks the charging/discharging status (809). If the device is in the charging state, the rate of voltage decline (dV/dt) is measured and compared to a threshold value (810). If dV/dt is not greater than a preset threshold, the A/D sampler 802 continues with the voltage sampling. If dV/dt is greater than the reference threshold, the charging abnormality timer is enabled (811). If the abnormality time counted by the timer is shorter than a threshold value, the A/D sampler continues. If the time of the abnormality reaches the threshold value, the charging circuit is shut down (812).

When $V_{actual}$ is greater than $V_{ref}$ (807) and the device is in the discharging state, the discharging abnormality timer is enabled (813). When the discharging abnormality time reaches a preset value (814), the discharging circuit is shut down. If the discharging abnormality time is shorter than the preset value, the system examines whether the voltage drop is greater than a threshold value (815). If the voltage drop is indeed greater than the threshold, the discharging circuit is shutdown; otherwise, the A/D sampler will continue its sampling process.

Blocks 807, 808, 816, 817, and 818 together implement the function that resets the abnormality timer if the voltage decline is reversed to a period of voltage increase. When $V_{actual}$ is greater than $V_{ref}$, which means that a voltage drop is reversed to voltage increase at least temporarily, the delay timer 816 is enabled. If the voltage increase continues for a period of time, as indicated by the count of the delay timer, which exceeds a preset threshold (817), the abnormality timer resets and the last $V_{actual}$ becomes $V_{ref}$ (818). However, if the delay time does not reaches its threshold when $V_{actual}$ again becomes less than $V_{ref}$, the delay timer is reset and the counting for the voltage decline time continues (808).

Although the invention has been described in detail with reference to several embodiments, additional variations and modifications exist within the scope and spirit of the invention as described and defined in the following claims.

What is claimed is:

1. A system for preventing battery damage by internal battery abnormalities during charging or discharging states of the battery, comprising:
   a first circuit for automatically determining when the battery is in a charging state and when the battery is in a discharging state;
   a second circuit for sampling a voltage of the battery at sequential time points;
   a third circuit for measuring a decline of the voltage;
   a fourth circuit for counting $T_{dec}$, which is a time during which the voltage is in decline, and for counting $T_{rise}$, which is a time during which the voltage increases after a period of decline, wherein the count of $T_{dec}$ is reset to zero when $T_{rise}$ lasts longer than a preset time delay, and wherein the count of $T_{dec}$ is resumed when the voltage resumes its decline after a period of increase and $T_{rise}$ of the period of increase is shorter than the preset time delay;
   a fifth circuit for measuring a rate of the decrease of the voltage; and
   a sixth circuit for producing an indicator of internal battery abnormality under the following conditions:
      when the battery is in the discharging state and the rate of the decrease of the voltage exceeds a predetermined decline rate;
      when the battery is in the charging state and $T_{dec}$ exceeds a predetermined time; and
      when the battery is in the charging state and the decrease of the voltage exceeds a predetermined voltage.

2. The system of claim 1, further comprising:
   a seventh circuit for charging and/or discharging the battery; and
   a switch that turns off the seventh circuit in response to said indicator for internal abnormality.

3. The method of claim 1, wherein said predetermined time being between 8 and 23 seconds, said predetermined voltage being between 175 and 225 mV, and said predetermined decline rate being between 250 and 350 mV per second.

4. The method of claim 2, wherein said predetermined time being between 8 and 23 seconds, said predetermined voltage being between 175 and 225 mV, and said predetermined decline rate being between 250 and 350 mV per second.

5. The system of claim 1, wherein said preset delay time is between 2 and 4 seconds.

6. The system of claim 2, further comprising an eighth circuit which integrates said indicator for internal abnormality with indicators for external abnormality so that either the internal abnormality or the external abnormality turns off said switch that controls the seventh circuit.

7. The system of claim 6, wherein said eighth circuit is a NAND gate that receives the indicators for internal and external abnormalities as its input.

* * * * *